US010787883B2

(12) United States Patent
Montoya et al.

(10) Patent No.: US 10,787,883 B2
(45) Date of Patent: Sep. 29, 2020

(54) TESTABLE BACK PRESSURE VALVES

(71) Applicant: Chevron U.S.A. Inc., San Ramon, CA (US)

(72) Inventors: James Daniel Montoya, Santa Fe, NM (US); Heath Evan Lynch, Iowa Colony, TX (US); Jay Patrick Painter, League City, TX (US); Jacobo Rogelio Archuleta, Santa Fe, NM (US)

(73) Assignee: CHEVRON U.S.A. INC., San Ramon, CA (US)

( * ) Notice: Subject to any disclaimer, the term of this patent is extended or adjusted under 35 U.S.C. 154(b) by 219 days.

(21) Appl. No.: 15/840,852

(22) Filed: Dec. 13, 2017

(65) Prior Publication Data

US 2018/0163506 A1    Jun. 14, 2018

Related U.S. Application Data

(60) Provisional application No. 62/433,555, filed on Dec. 13, 2016.

(51) Int. Cl.
| | |
|---|---|
| *E21B 33/04* | (2006.01) |
| *E21B 34/02* | (2006.01) |
| *F16K 15/02* | (2006.01) |
| *F16K 17/18* | (2006.01) |

(52) U.S. Cl.
CPC .............. *E21B 34/02* (2013.01); *E21B 33/04* (2013.01); *F16K 15/02* (2013.01); *F16K 15/026* (2013.01); *F16K 17/18* (2013.01)

(58) Field of Classification Search
CPC .................................. E21B 33/03; E21B 33/04
USPC ......................................................... 137/614.2
See application file for complete search history.

(56) References Cited

U.S. PATENT DOCUMENTS 3,542,063 A * 11/1970 Etter .......................... F16K 1/30
137/512.3
2014/0116720 A1    5/2014  He et al.
2016/0186527 A1    6/2016  Cocker

* cited by examiner

*Primary Examiner* — Giovanna Wright
(74) *Attorney, Agent, or Firm* — King & Spalding LLP

(57) ABSTRACT

A testable back pressure valve can include a housing comprising a housing body. The valve can also include a valve seat coupled to the housing, where the valve seat includes a valve seat body having a first cavity and a second cavity, and where the valve seat further includes a first network of channels disposed in the valve seat body. The valve can further include a valve head movably disposed within the first cavity of the valve seat. The valve can also include a piston follower movably disposed within the second cavity of the valve seat, where the valve head is fixedly coupled to the piston follower. The valve can further include a travel piston movably disposed within the second cavity of the valve seat, where the travel piston is moveably coupled to the piston follower.

20 Claims, 14 Drawing Sheets

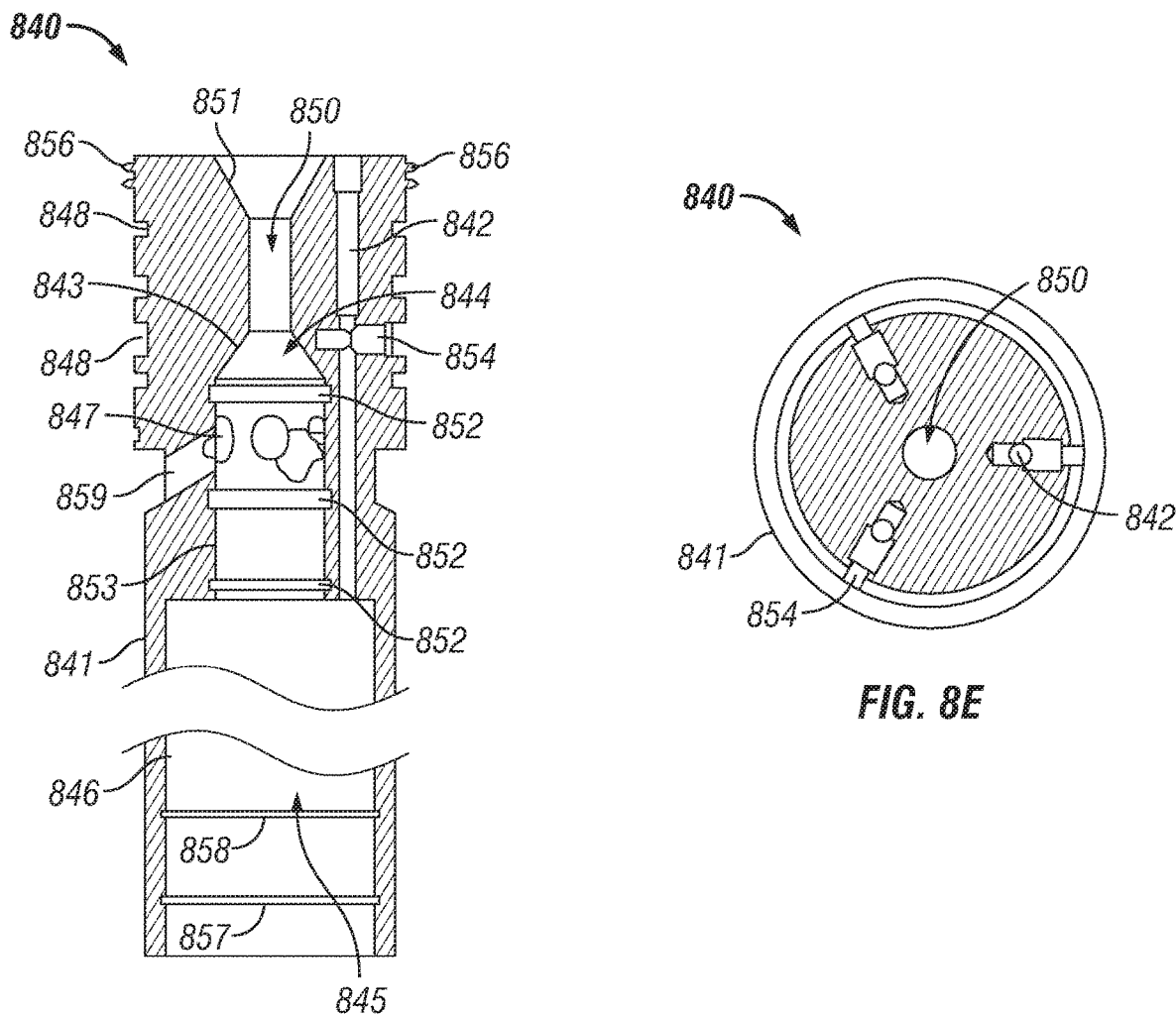
FIG. 8D
FIG. 8E
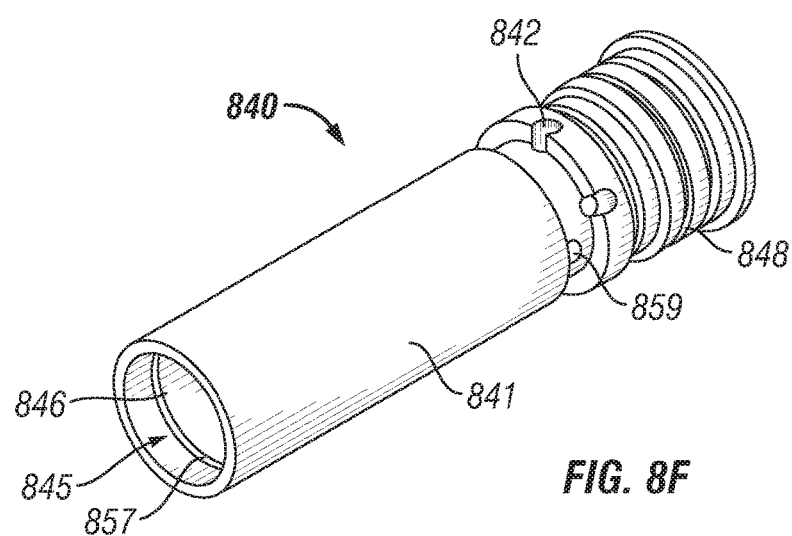
FIG. 8F

TESTABLE BACK PRESSURE VALVES

CROSS-REFERENCE TO RELATED APPLICATIONS

This application claims priority under 35 U.S.C. § 119 to U.S. Provisional Patent Application Ser. No. 62/433,555, titled "Testable Back Pressure Valves" and filed on Dec. 13, 2016, the entire contents of which are hereby incorporated herein by reference.

TECHNICAL FIELD

The present disclosure relates generally to subterranean field operations, and more specifically to assemblies used to test back pressure valves.

BACKGROUND

Back pressure valves and two way check valves are used to temporarily seal and contain oil and gas well fluids. For example, a back pressure valve can be used during removal of a pressure control system (e.g. blow out preventer (BOP)) and subsequent installation of production equipment (e.g. production tree). Conventional back pressure valves include various types of spring and plunger designs mounted to openings of tubing and casing hangers that accomplish sealing. However, conventional back pressure valves are not able to be tested once installed, and periodically thereafter if desired at test pressures and operational temperatures. In addition, there are two designs (back pressure valve and two way check valve) that are required for typical operation. This requires the removal of a back pressure valve, installation of a two way check valve to test against, subsequent removal of the two way check valve, and sometimes the subsequent re-installation of the back pressure valve. Therefore, there is a need in the industry for a back pressure valve that can also function as a two way check valve without removal, thus allowing for testing in situ.

SUMMARY

In general, in one aspect, the disclosure relates to a testable back pressure valve. The testable back pressure valve can include a housing that includes a housing body, and a valve seat coupled to the housing, where the valve seat includes a valve seat body having a first cavity and a second cavity, and where the valve seat further includes a first network of channels disposed in the valve seat body. The testable back pressure valve can also include a valve head movably disposed within the first cavity of the valve seat, and a piston follower movably disposed within the second cavity of the valve seat, where the valve head is fixedly coupled to the piston follower. The testable back pressure valve can further include a travel piston movably disposed within the second cavity of the valve seat, where the travel piston is moveably coupled to the piston follower.

In another aspect, the disclosure can generally relate to a valve system. The valve system can include a casing head, and a testable back pressure valve disposed within the casing head. The testable back pressure valve can include a housing having a housing body, and a valve seat coupled to the housing, where the valve seat includes a valve seat body having a first cavity and a second cavity, and where the valve seat further includes a first network of channels disposed in the valve seat body. The testable back pressure valve can include a valve head movably disposed within the first cavity of the valve seat, and a piston follower movably disposed within the second cavity of the valve seat, where the valve head is fixedly coupled to the piston follower. The testable back pressure valve further include a travel piston movably disposed within the second cavity of the valve seat, where the travel piston is moveably coupled to the piston follower.

These and other aspects, objects, features, and embodiments will be apparent from the following description and the appended claims.

BRIEF DESCRIPTION OF THE DRAWINGS

The drawings illustrate only example embodiments of methods, systems, and devices for testable back pressure valves and are therefore not to be considered limiting of its scope, as testable back pressure valves may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 8A-8F show a valve seat of the testable back pressure valve of FIG. 4.

DETAILED DESCRIPTION OF EXAMPLE EMBODIMENTS

Figure 1:
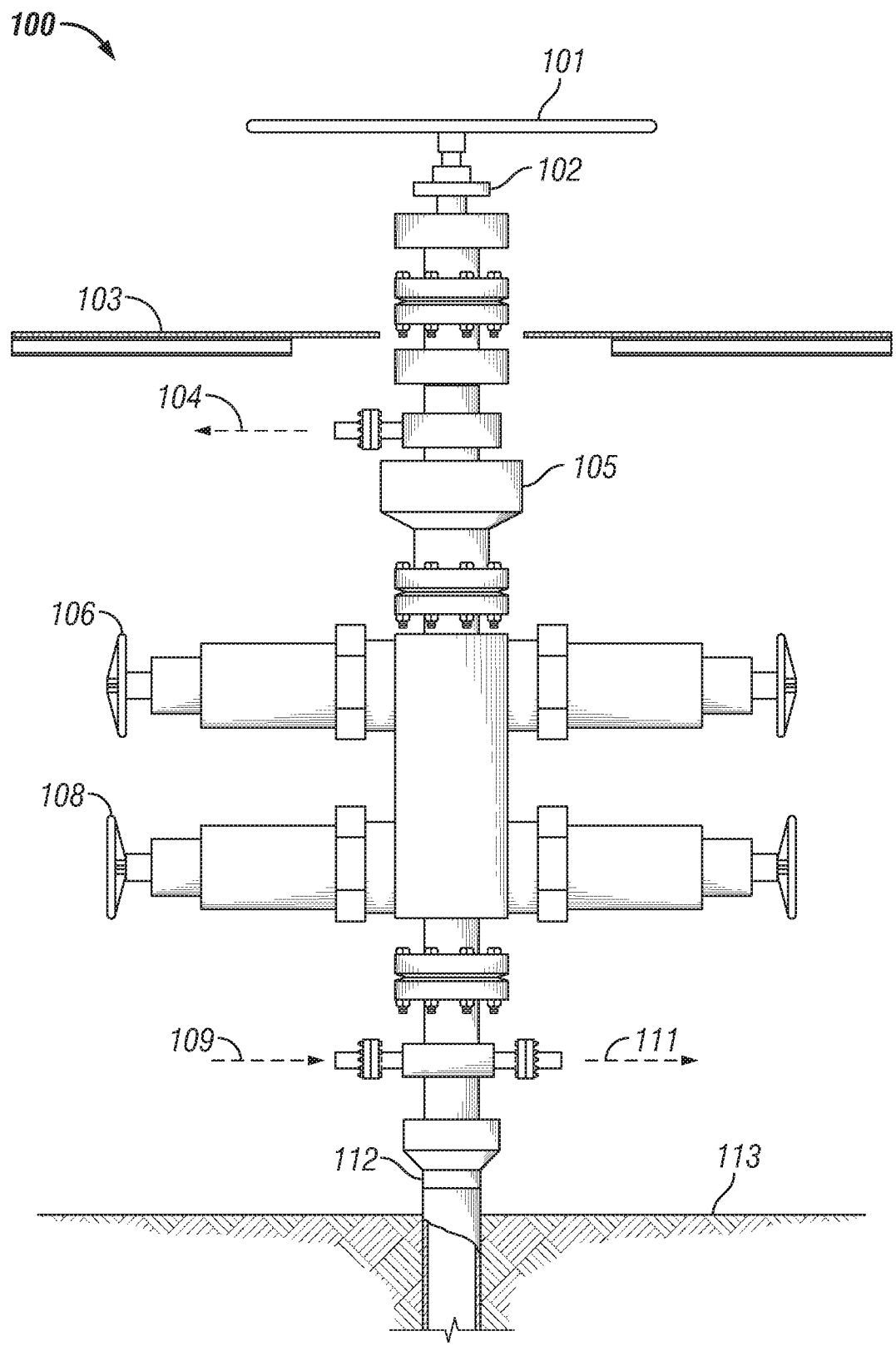
FIG. 1 shows a BOP system currently used in the art.

The example embodiments discussed herein are directed to systems, apparatuses, and methods of testable back pressure valves. While the testable back pressure valves shown in the figures and described herein are directed to use in a subterranean wellbore, example testable back pressure valves can also be used in other applications, aside from a wellbore, in which a core sample is needed. Thus, the examples of testable back pressure valves described herein are not limited to use in a subterranean wellbore.

Further, while some example embodiments described herein use hydraulic material and a hydraulic system to operate the testable back pressure valves described herein, example testable back pressure valves can also be operated using other types of systems, such as pneumatic systems. Thus, such example embodiments are not limited to the use of hydraulic material and hydraulic systems. A user as described herein may be any person that is involved with a field operation (e.g., between removal of a pressure control system, such as a BOP, and installation of production equipment, such as a production tree) in a subterranean wellbore. Examples of a user may include, but are not limited to, a roughneck, a company representative, a drilling engineer, a tool pusher, a service hand, a field engineer, an electrician, a mechanic, an operator, a consultant, a contractor, and a manufacturer's representative.

Any example testable back pressure valves, or portions (e.g., components) thereof, described herein can be made from a single piece (as from a mold). When an example testable back pressure valve or portion thereof is made from a single piece, the single piece can be cut out, bent, stamped, and/or otherwise shaped to create certain features, elements, or other portions of a component. Alternatively, an example testable back pressure valve (or portions thereof) can be made from multiple pieces that are machined and mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example subterranean coring assembly) can be made of one or more of a number of suitable materials, including but not limited to metals (e.g., stainless steel), ceramics, rubbers, and plastics. Materials are utilized based on functionality and design requirements, such as, for example, strength, sealing, and corrosion.

A coupling feature (including a complementary coupling feature) as described herein can allow one or more components and/or portions of an example testable back pressure valve to become mechanically coupled, directly or indirectly, to another portion of the testable back pressure valve and/or another component of a field system. A coupling feature can include, but is not limited to, a portion of a hinge, an aperture, a recessed area, a protrusion, a slot, a spring clip, a tab, a detent, and mating threads. One portion of an example testable back pressure valve can be coupled to another portion of a testable back pressure valve and/or another component of a field system by the direct use of one or more coupling features.

In addition, or in the alternative, a portion of an example testable back pressure valve can be coupled to another portion of the testable back pressure valve and/or another component of a field system using one or more independent devices that interact with one or more coupling features disposed on a component of the testable back pressure valve. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In certain example embodiments, field systems that include example testable back pressure valves are subject to meeting certain standards and/or requirements. For example, the American Petroleum Institute (API), the International Standards Organization (ISO), and the Occupational Health and Safety Administration (OSHA) set standards for field operations. Use of example embodiments described herein meet (and/or allow a corresponding field system to meet) such standards when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of testable back pressure valves will be described more fully hereinafter with reference to the accompanying drawings, in which example embodiments of testable back pressure valves are shown. Testable back pressure valves may, however, be embodied in many different forms and should not be construed as limited to the example embodiments set forth herein. Rather, these example embodiments are provided so that this disclosure will be thorough and complete, and will fully convey the scope of testable back pressure valves to those of ordinary skill in the art. Like, but not necessarily the same, elements in the various figures are denoted by like reference numerals for consistency.

Terms such as "first", "second", "end", "inner", "outer", "top", "bottom", "upward", "downward", "upper", "lower", "middle", "up", "down", "distal", and "proximal" are used merely to distinguish one component (or part of a component or state of a component) from another. Such terms are not meant to denote a preference or a particular orientation. Also, the names given to various components described herein are descriptive of one embodiment and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows a side view of a BOP system 100 (also called a BOP stack 100) in which example embodiments can be used. The BOP system 100 of FIG. 1 includes an injector head 101 located above the drill floor 103, with a stripper 102 located between the injector head 101 and the drill floor 103. The injector head 101 is part of a coiled tubing unit and includes one or more chain assemblies to grip a coiled tubing string. The injector head 101 can also include a hydraulic drive system for inserting and retrieving the coiled tubing string relative to the wellbore. The stripper 102 secures the base of the injector head 101.

Below the drill floor 103 is located a mud return line 104, followed downward by an annular blowout preventer 105, followed by blind rams 106, followed by shear rams 108, followed by a kill line 109 and a choke line 111, followed by the wellhead casing 112 located just above the surface 113. The mud return line 104 sends mud from downhole to a mud processing system for analysis and recirculation. The annular blowout preventer 105 is a large valve that is used to control wellbore fluids. The annular blowout preventer 105 commonly resembles a rubber donut that is inflated to seal around piping or, if no piping is present, to seal an open hole. The annular blowout preventer 105 is often redundant of downhole components (e.g., the shear rams 108) of the BOP system 100.

The blind rams 106 are two blocks of steel that meet in the center to close off an open hole. Usually, the ends of the blind rams 106 are blunted, and so are not designed to cut into pipe that might be disposed through the height of the BOP system 100. The shear rams 108 are like the blind rams 106, but the ends of the shear rams 108 are designed to shear through any pipe that might be disposed through the height of the BOP system 100. Once the pipe is cut (or sheared) by the shear rams 108, it is usually left hanging in the BOP system 100 (also called a BOP stack 100), which makes kill operations become more difficult. When the shear rams 108 operate, the joint of the drillpipe or tubing is destroyed in the process, but the rest of the string is unharmed by the operation of shear rams 108.

The kill line 109 is a series of high-pressure pipes leading from an outlet on the BOP stack 100 to high-pressure pumps. During normal well control operations, kill fluid is pumped through the drillstring, and annular fluid is taken out of the well through the choke line 111 to a backpressure choke, which drops the fluid pressure to atmospheric pressure. If the drillpipe is inaccessible, it may be necessary to pump heavy drilling fluid in the top of the well, wait for the fluid to fall under the force of gravity, and then remove fluid from the annulus.

The choke line 111 is a series of high-pressure pipes leading from an outlet on the BOP stack to the backpressure choke and associated manifold. During well-control operations, the fluid under pressure in the wellbore flows out of the well through the choke line 111 to the choke, reducing the fluid pressure to atmospheric pressure. The wellhead casing 112 (also called a casing head 112) is an adapter disposed between the first casing string and either the BOP system 100 (during drilling) or the production system 207 of FIGS. 2A and 2B (after completion). This wellhead casing 112 can be threaded or welded onto the casing, and it can have a flanged or clamped connection to match the BOP system 100 or production system 207.

Figure 2A:
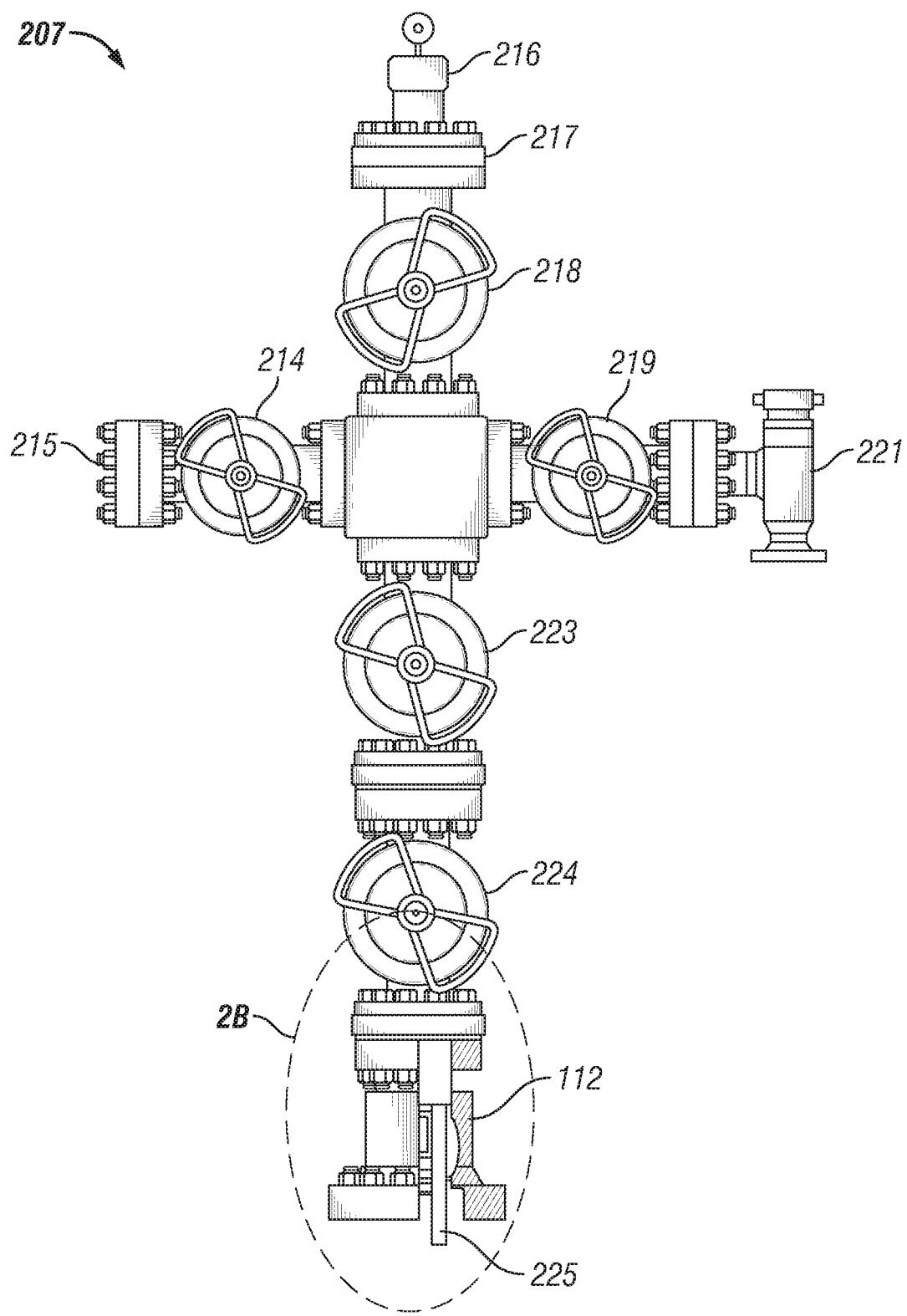
FIGS. 2A and 2B show a production system currently used in the art.
Figure 2B:
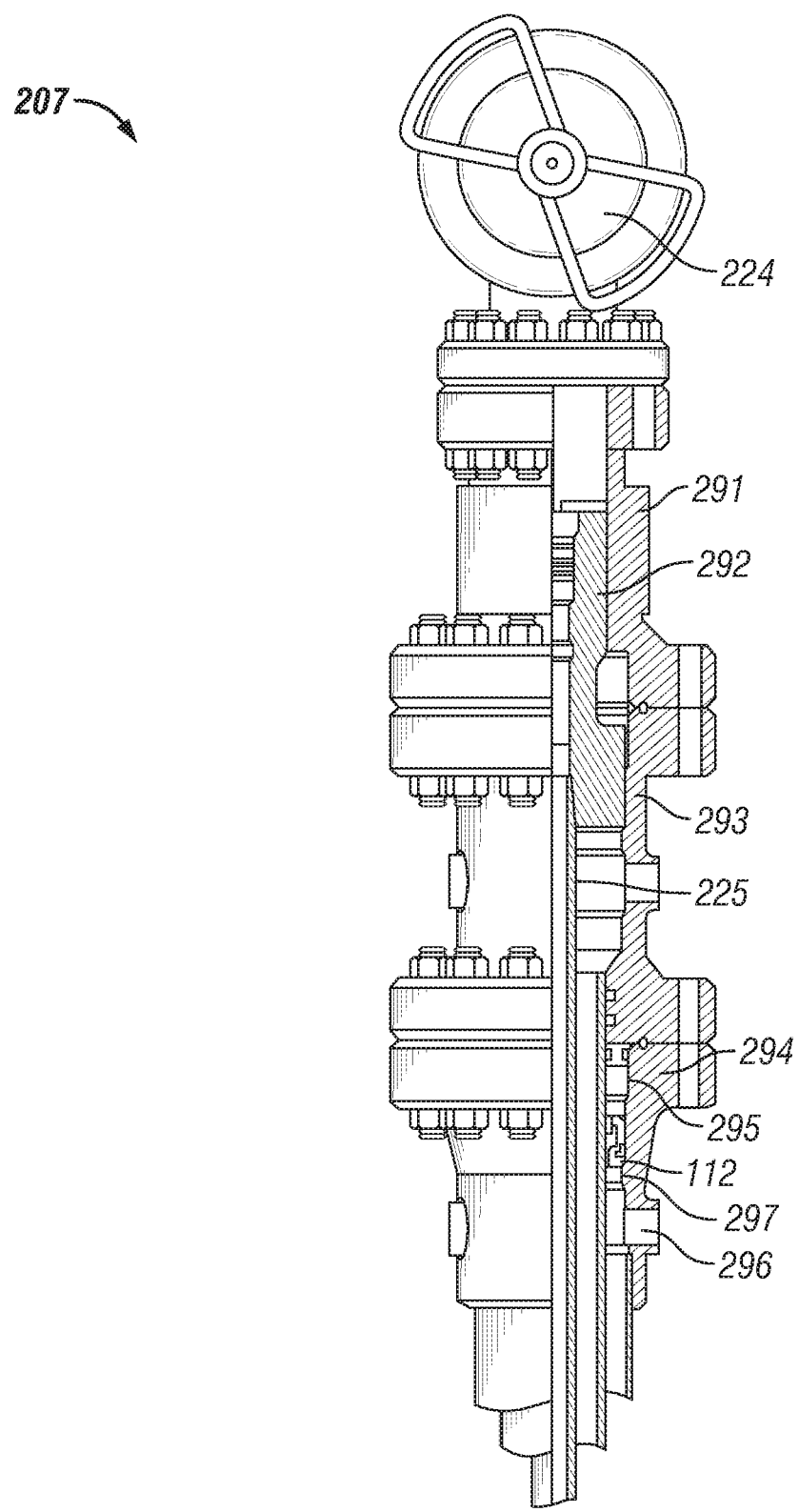

The BOP system 100 is used during drilling and other exploration-related operations of a subterranean field. When these operations are complete, then the BOP system 100 is removed and replaced by a production system 207 (also called a production tree 207 and a Christmas tree 207), as shown in FIGS. 2A and 2B. Referring to FIGS. 1-2B, the production tree 207 of FIGS. 2A and 2B includes the wellhead casing 112, working upward followed by a lower master valve 224 and an upper master valve 223. Above the upper master valve 223 are three branches, and so the formation lends itself to the name Christmas tree 207.

One branch upward from the upper master valve 223 includes a kill wing valve 214 followed by a kill wing connection 215. A second branch upward from the upper master valve 223 includes a swab valve 218, a tree adapter 217, and a tree cap and gauge 216. The third branch upward from the upper master valve 223 includes a production wing valve 219 followed by a surface choke 221.

Below the lower master valve 224, a more detailed semi-cross sectional side view of the production tree 207 is shown in FIG. 2B. These components of FIG. 2B are also found below the kill line 109 and choke line 111 of the BOP system 100. Specifically, working downward from the lower master valve 224 is the tubing head adapter 291 followed by the tubing head 293, both of which are used to encase and support the tubing hanger 292. Below the tubing hanger 292 is the tubing string 225. Below the tubing head 293 is the casing bowl 294, which is used to house and support the casing hanger cap 295, the casing hanger 297, and the casing head 112. The casing bowl 294 can include a port 296 for a casing valve.

Figure 3:
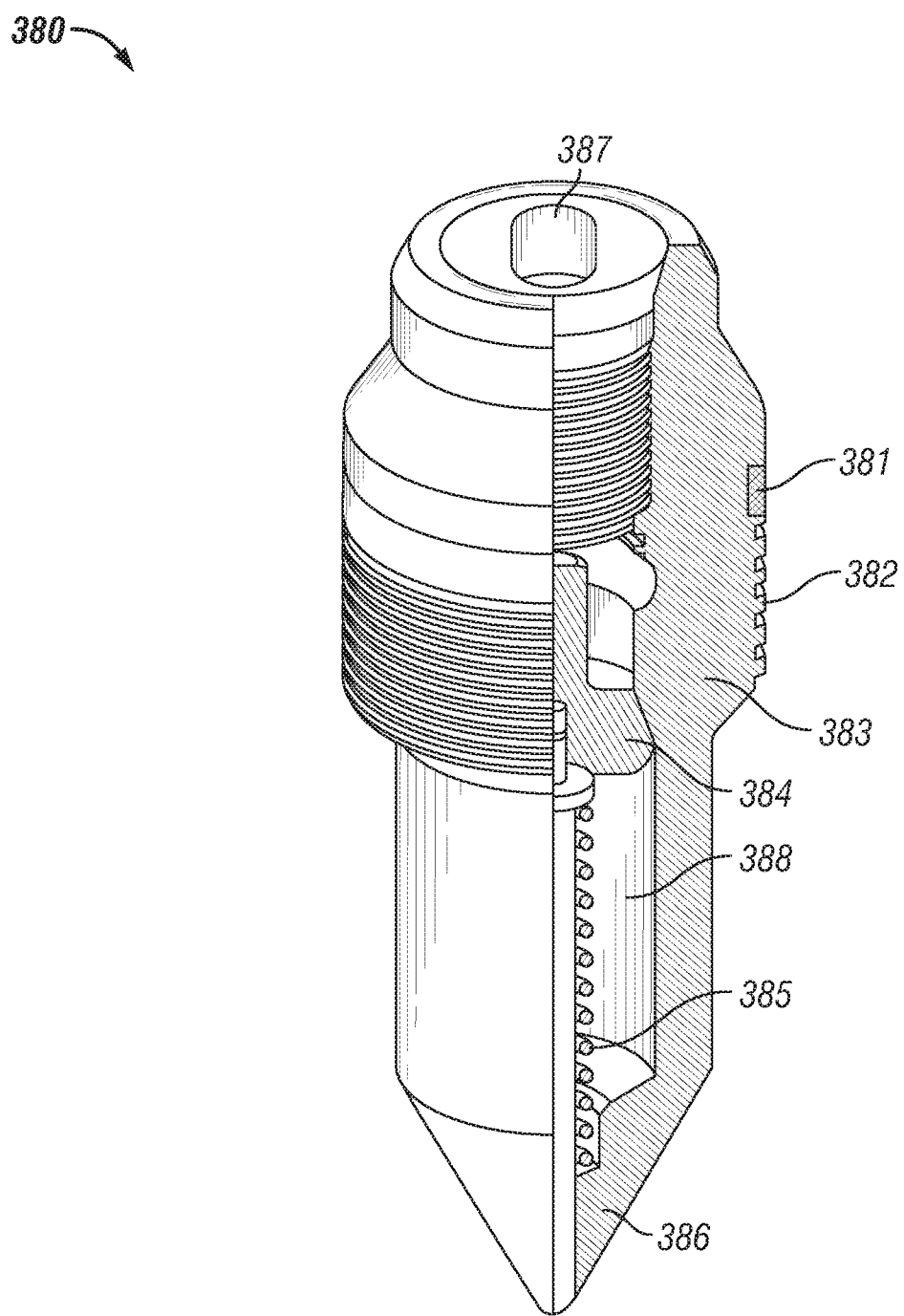
FIG. 3 shows a back pressure valve currently used in the art.

As the BOP system 100 of FIG. 1 is replaced by the production system 207 of FIGS. 2A and 2B, a back pressure valve 380 in the current art, as shown in FIG. 3, is installed in the tubing hanger 292 to isolate the production tubing 225. The back pressure valve 380 is designed to hold pressure from below, yet enable fluids to be pumped from above downhole, as may be required for well-control purposes. Referring to FIGS. 1-3, the back pressure valve 380 of the current art includes a body 383 that has an outer surface that includes mating threads 382 and one or more channels into which one or more sealing members 381 (e.g., gaskets, o-rings) can be disposed.

The body 383 forms a cavity 388 inside of which are disposed a valve 384 and a spring 385 disposed under the valve 384. The spring 385 forces the valve 384 upward against the body 383, unless a downward force from fluid being forced downhole is large enough to overcome the upward force of the spring 385. There is an aperture 387 in the top of the body 383 through which such fluid can flow to reach the top of the valve 384. The bottom of the body includes a valve stem 386.

As discussed above, back pressure valves in the current art, such as back pressure valve 380, are effective at preventing the uncontrolled flow of downhole hydrocarbon fluids and gasses to the surface, but allows fluids to be pumped into the wellbore for well control/kill operations. However, back pressure valves in the current art, such as back pressure valve 380, cannot be tested once they are installed. By contrast, example back pressure valves, such as shown and described herein, not only prevent the uncontrolled flow of downhole hydrocarbon fluids and gasses to the surface and allow fluids to be pumped into the wellbore for well control/kill operations, but example back pressure valves can be tested once they are installed. Specifically, the pressure barriers of example back pressure valves are fully testable, both above and below the back pressure valve unit, after installation.

Figure 4:
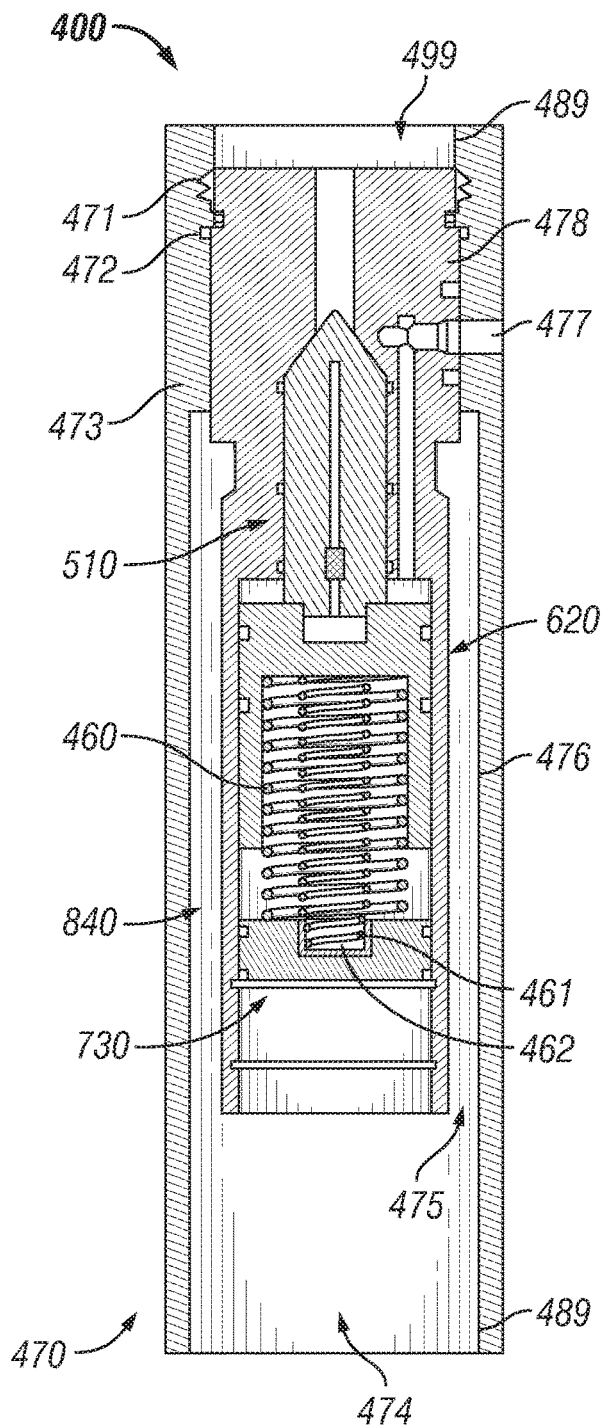
FIG. 4 shows a cross-sectional side view of a testable back pressure valve in accordance with certain example embodiments.
Figure 5A:
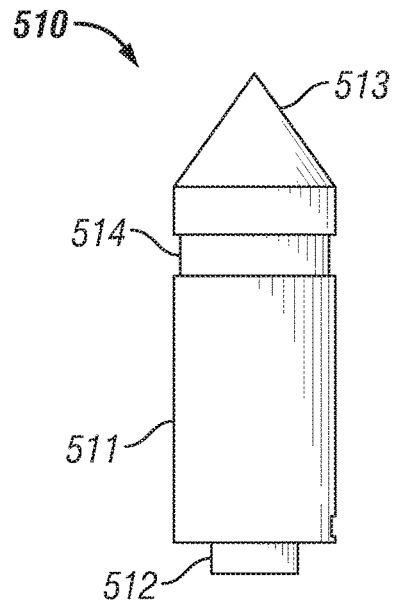
FIGS. 5A and 5B show a valve of the testable back pressure valve of FIG. 4.
Figure 5B:
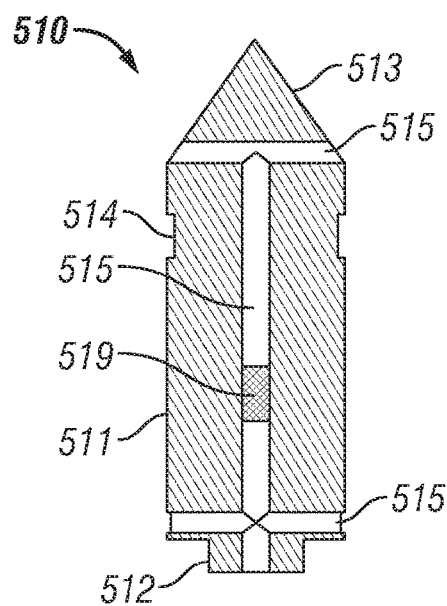

FIG. 4 shows a cross-sectional side view of a testable back pressure valve 400 in accordance with certain example embodiments. FIGS. 5A and 5B show a valve head 510 of the testable back pressure valve 400 of FIG. 4. FIGS. 6A-6D show a piston follower 620 of the testable back pressure valve 400 of FIG. 4. FIGS. 7A-7D show a travel piston 730 of the testable back pressure valve 400 of FIG. 4. FIGS. 8A-8F show a valve seat 840 of the testable back pressure valve 400 of FIG. 4.

Figure 6A:
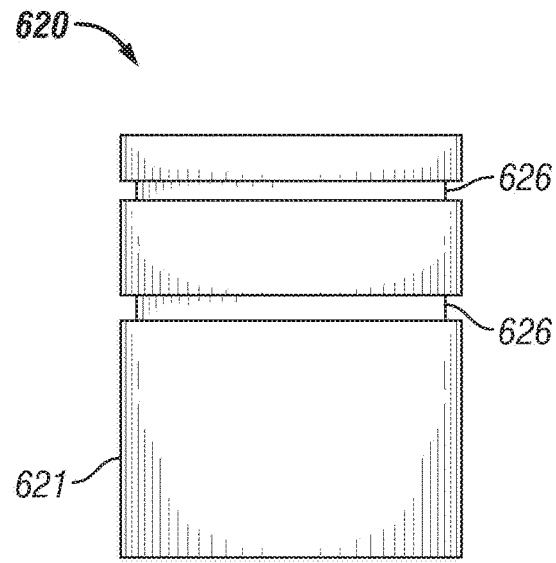
FIGS. 6A-6D show a piston follower of the testable back pressure valve of FIG. 4.
Figure 6B:
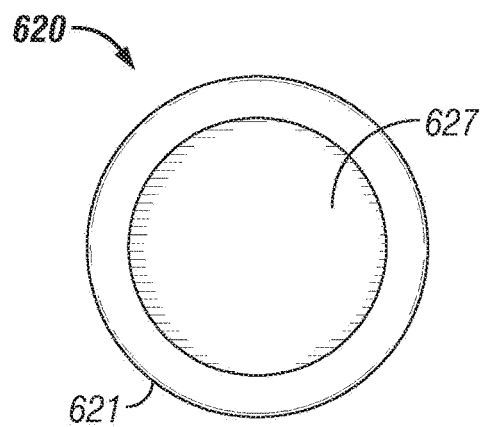
Figure 6C:
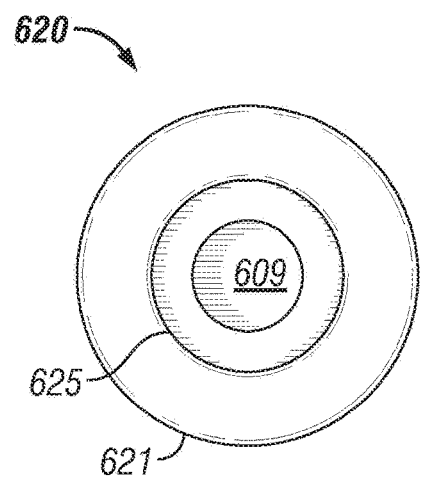
Figure 6D:
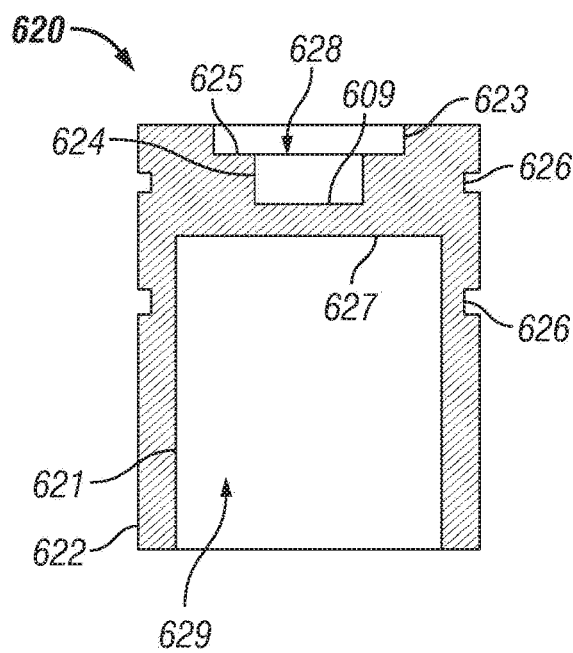
Figure 7A:
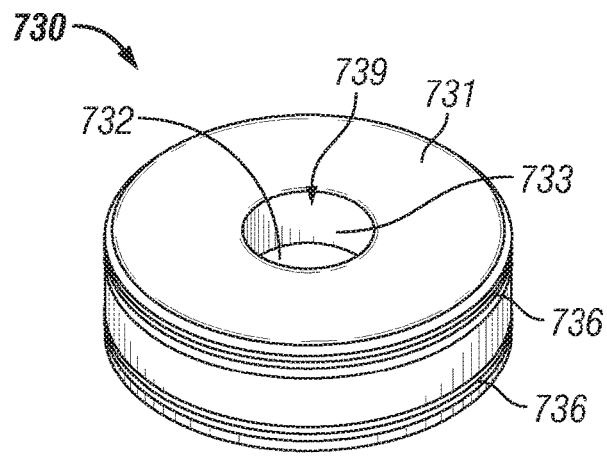
FIGS. 7A-7D show a travel piston of the testable back pressure valve of FIG. 4.
Figure 7B:
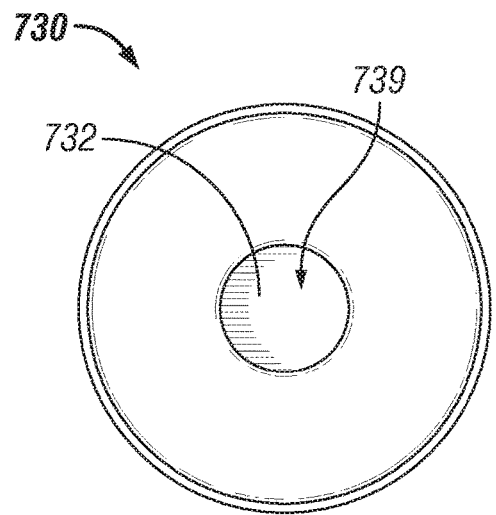
Figure 7C:
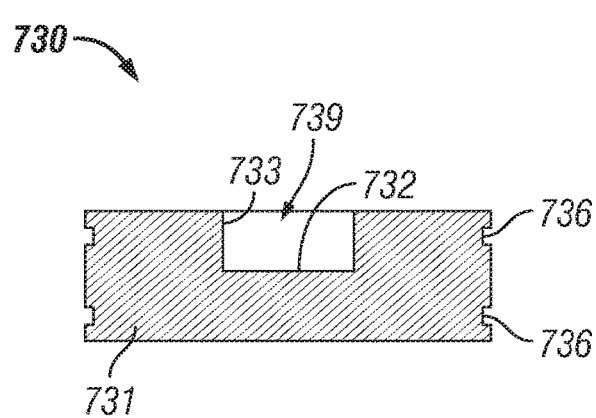
Figure 7D:
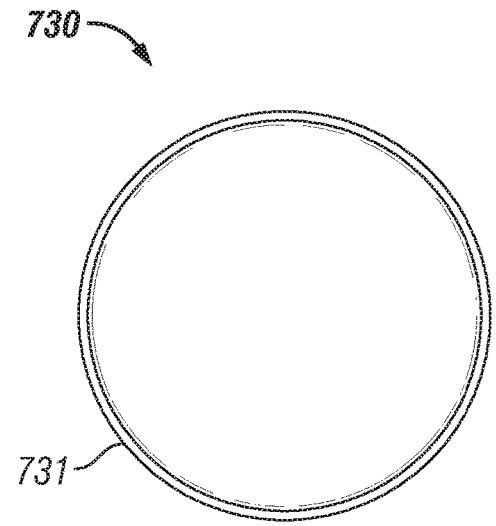

Specifically, FIG. 5A shows a side view of the valve head 510. FIG. 5B shows a cross-sectional side view of the valve head 510. FIG. 6A shows a side view of the piston follower 620. FIG. 6B shows a top view of the piston follower 620. FIG. 6C shows a bottom view of the piston follower 620. FIG. 6D shows a cross-sectional side view of the piston follower 620. FIG. 7A shows a top-front perspective view of the travel piston 730. FIG. 7B shows a top view of the travel piston 730. FIG. 7C shows a cross-sectional side view of the travel piston 730. FIG. 7D shows a bottom view of the travel piston 730.

Figure 8A:
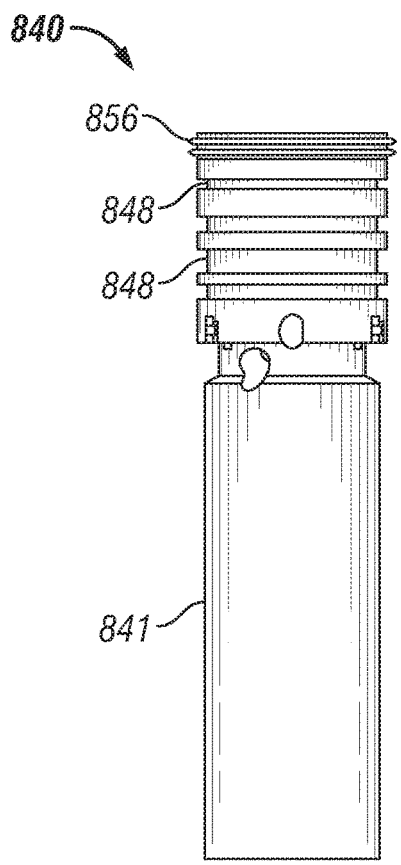
Figure 8B:
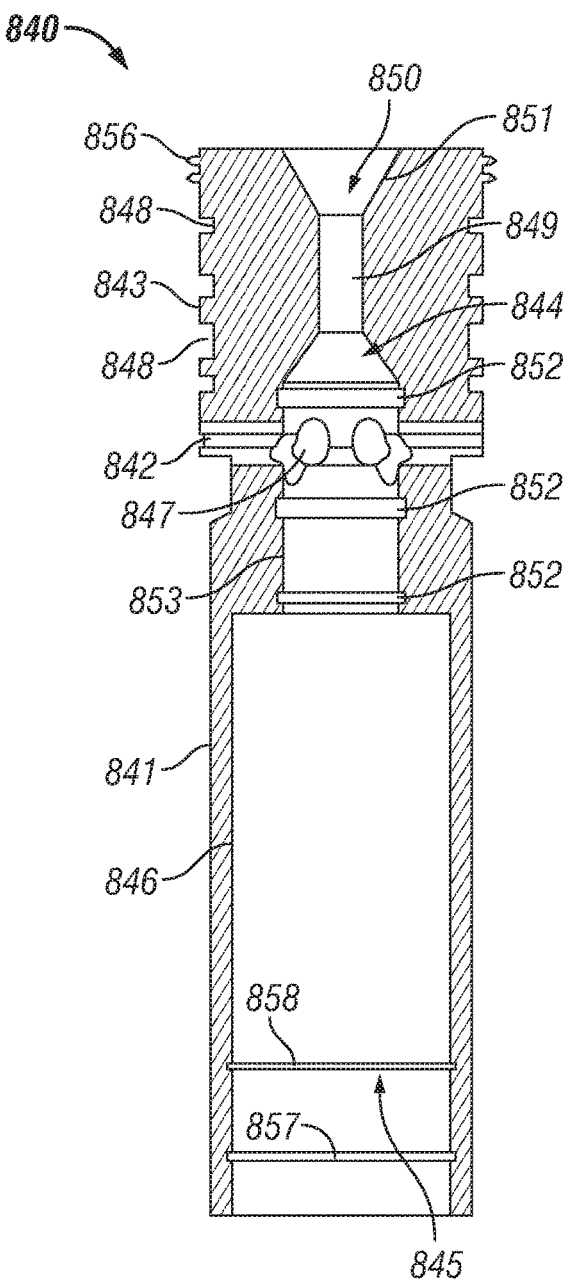
Figure 8C:
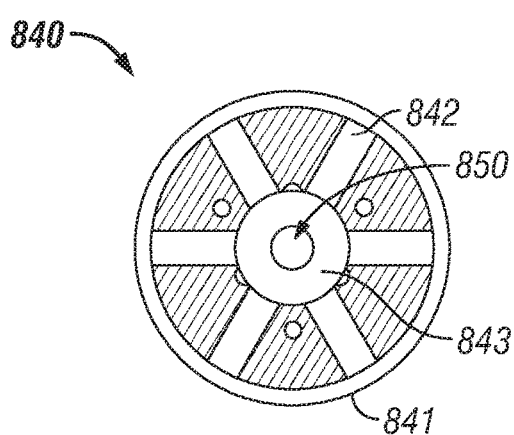

FIG. 8A shows a side view of the valve seat 840. FIG. 8B shows a cross-sectional side view of the valve seat 840. FIG. 8C shows a cross-sectional bottom view of a section of the valve seat 840. FIG. 8D shows a cross-sectional front view of the valve seat 840. FIG. 8E shows a cross-sectional bottom view of another section of the valve seat 840. FIG. 8F shows a bottom-front-side perspective view of the travel valve seat 840.

Referring to FIGS. 1-8F, the example testable back pressure valve 400 can include one or more of a number of components. For example, as shown in FIG. 4, testable back pressure valve 400 can include the valve head 510, the piston follower 620, the travel piston 730, the valve seat 840, a housing 470, a first resilient device 460 (e.g., a spring), an optional second resilient device 461, and an optional retractable extension 462. Further, the various components of the example back pressure valve 400 can have any of a number of configurations. For example, in this case, the valve head 510, the piston follower 620, the travel piston 730, the first resilient device 460, the optional second resilient device 461, and the optional retractable extension 462 are all disposed within the valve seat 840, and the valve seat 840 is disposed within the housing 470 of the testable back pressure valve 400.

As shown in detail in FIGS. 8A-8F, the valve seat 840 has a body 841 inside of which are disposed a number of features. For example, there can be one or more channels 842 disposed within the body 841. A channel 842 can allow fluid to pass therethrough during testing to actuate the piston follower 620 and travel piston 730. When a valve seat 840 has multiple channels 842, one channel 842 can be independent of or interconnected with one or more of the other channels 842 disposed in the body 841. A channel 842 can be disposed along the height of the valve seat 840, the width of the valve seat 840, and/or any other orientation within the valve seat 840. Multiple hydraulic test channels can facilitate testing of the testable back pressure valve 400 either through the wellbore or through the wellhead structure, depending on availability.

While not shown in FIGS. 8A-8F, one or more devices (e.g., valves, check valves) can be disposed in or otherwise integrated with one or more of the channels 842 in the body 841 of the valve seat 840. If such a device is a check valve, then the flow of fluid flowing through the channels 842 can be regulated in certain directions. If such a device is a valve, then in certain example embodiments, the valve can be opened or closed by a user, making the network of channels configurable. Such a capability can be useful for varying operations (e.g., check valve seal test, prevent hydro-locking) or to isolate a portion (e.g., a port 854) of the testable back pressure valve 400 for some reason (e.g., a port 854 has plugged).

As another example, a valve seat 840 can have one or more (in this case, three) ports 854 disposed along an outer surface of the body 841. Each port 854 can be connected to a channel 842. A port 854 can be used to allow fluids to flow into and/or out of the valve seat 840. A port 854 can be aligned with an aperture in the housing 470 to send and receive fluids outside of the testable back pressure valve 400. The valve seat 840 in this case also includes an exhaust port 859 that allows fluid to flow between the valve seat 840 and the housing 470 within the testable back pressure valve 400. The exhaust port 859 can be considered a type of channel 842.

There can be one or more cavities formed within the body 841 of the valve seat 840. For example, in this case, there are three cavities that have continuity between them in the absence of the other components (e.g., the valve head 510, the piston follower 620, the travel piston 730). Cavity 850 is disposed toward the top end of the valve seat 840, having an opening that is exposed at the top end of the valve seat 840. Cavity 850 is formed by inner wall 851 (at its top) and inner wall 849 (at its bottom) to form a funnel-shape. As shown in FIG. 4, there are no components (aside from occasionally the tip 513 of the valve head 510) of the testable back pressure valve 400 that are disposed in cavity 850. Rather, fluids from the surface are delivered to the testable back pressure valve 400 through cavity 850.

Below cavity 850 is cavity 844, which is formed by inner wall 843 and inner wall 853. The portion of cavity 844 formed by the inner wall 843 is conical in this example, expanding down the height of the inner wall 843, and the portion of cavity 844 formed by the inner wall 853 is cylindrical in this case. Cavity 844 is shaped and sized to abut against the outer surfaces of the valve head 510 when the valve head 510 is closed. In this way, the inner wall 843 serves as a valve seat for the valve head 510. In addition, cavity 844 is shaped and sized to allow the valve head 510 to move vertically therein. Cavity 844 can also be in communication with one or more channels 842 and the exhaust port 859 through apertures 847 in the inner wall 853.

In some cases, the inner wall 853 that forms the cavity 844 can have one or more of a number of features disposed thereon. For example, as shown in FIGS. 8B and 8D, there can be a number of recesses 852 disposed therein. Such recesses 852 can be used to receive a sealing member (e.g., an o-ring, a gasket, a wiper seal) to provide a seal between the valve seat 840 and the valve head 510 of the testable back pressure valve 400.

Below cavity 844 is cavity 845, which is formed by inner wall 846. The cavity 845 formed by inner wall 846 is cylindrical in this example and is wider than the cylindrical portion of cavity 844. Cavity 845 is shaped and sized to abut against the outer surfaces of the piston follower 620 and travel piston 730, allowing those components to move vertically therein within the cavity 845. There can be one or more features (feature 858, feature 857) disposed on the inner wall 846 that forms cavity 845. These features, which in this case are protrusions that extend into the cavity 845 and are set in a horizontal plane, with feature 858 being disposed above feature 857, can be used to limit the range of motion for one or more components of the testable back pressure valve 400 that are disposed in cavity 845. For example, feature 858 acts as a stop or retaining ring that prevents the bottom edge of the travel piston 730 from traveling further downward within the cavity 845.

The outer surfaces of the body 841 of the valve seat 840 can have one or more of a number of features disposed thereon. For example, as shown in FIGS. 8A, 8B, 8D, and 8F, there can be a number of recesses 848 disposed therein. Such recesses 848 can be used to receive a sealing member (e.g., an o-ring, a gasket) to provide a seal between the valve seat 840 and the housing 470 of the testable back pressure valve 400. As another example, there can be one or more of a number of coupling features 856 (in this case, mating threads) disposed on one or more outer surfaces of the body 841 of the valve seat 840 to allow the valve seat 840 to be coupled to the housing 470 of the testable back pressure valve 400.

The valve head 510 of the testable back pressure valve 400 can have any of a number of features and/or configurations. For example, as shown in FIGS. 5A and 5B, the valve head 510 can have a main body 511 inside of which can be disposed one or more channels 515. The channels 515 can be substantially the same as the channels 842 of the valve seat 840. In some cases, one or more of the channels 515 of the valve head 510 can align with a channel 842 of the valve seat 840 when the valve head 510 is in a certain position within the cavity 844 of the valve seat 840.

In some cases, one or more devices 519 (e.g., valves, check valves) can be disposed in or otherwise integrated with one or more of the channels 515 in the valve head 510. If such a device 519 is a check valve, then the flow of fluid flowing through the channels 515 can be regulated in certain directions (e.g., upward only). If such a device 519 is a valve, then in certain example embodiments, the valve can be opened or closed by a user, making the network of channels configurable. Such a capability can be useful for varying operations (e.g., check valve seal, run kill fluid downhole) or to isolate a portion (e.g., a port 854 adjacent to a channel 515) of the testable back pressure valve 400 for some reason.

In addition, the valve head 510 can include a top portion 513 that is conically shaped (as opposed to the cylindrical shape of the main body 511). As discussed above, the configuration (e.g., shape, size) of the top portion 513 and the main body 511 of the valve head 510 can complement the configuration of the cavity 844 of the valve seat 840 so that when the valve head 510 is fully inserted (in this case, upward) into the cavity 844, the outer surfaces of the valve head 510 form a seal with the inner wall 843 and the wall 853 of the valve seat 840. One or more channels 515 (or portions thereof) can be disposed in the top portion 513.

The valve head 510 can also include a bottom portion 512 that is cylindrically shaped in this case, having a diameter that is less than the diameter of the cylinder formed by the main body 511. The configuration (e.g., shape, size) of the bottom portion 512 of the valve head 510 can be designed to complement the configuration of the cavity 628 of the piston follower 620, as described below. One or more channels 515 (or portions thereof) can be disposed in the bottom portion 512.

The outer surfaces of the valve head 510 can have one or more of a number of features disposed thereon. For example, as shown in FIGS. 5A and 5B, there can be a number (in this case, one) of recesses 514 disposed therein. Such recesses 514 can be used to receive a sealing member (e.g., an o-ring, a gasket) to provide a seal between the valve head 510 and the valve seat 840. As another example, the outer surface of the bottom portion 512 can have one or more coupling features (e.g., mating threads) disposed thereon for coupling the valve head 510 to the piston follower 620.

The piston follower 620 of the testable back pressure valve 400 can have any of a number of features and/or configurations. For example, as shown in FIGS. 6A-6D, the piston follower 620 can have a body 621 that forms one or more cavities. In this case, the body 621 of the piston follower 620 forms cavity 628 and cavity 629. Cavity 628 is disposed at the top end of the piston follower 620, and cavity 629 is disposed at the bottom end of the piston follower 620.

Cavity 628 is formed by two layers of cylindrical shapes. The top cylindrical shape of cavity 628 is defined by wall 623 and wall 625, where the bottom cylindrical shape of cavity 628 is defined by wall 624 and wall 609. The diameter of the cylindrical shape defined by wall 624 is less than the diameter of the cylindrical shape defined by wall 623.

As discussed above, bottom portion of cavity 628 is configured (e.g., has a shape and size) to receive the bottom portion 512 of the valve head 510, and the top portion of cavity 628 is configured to receive the bottom end of the main body 511 of the valve head 510. In some cases, one or more of the outer walls that form cavity 628 can have one or more coupling features disposed thereon for coupling to the valve head 510. Alternatively, the walls that form the cavity 628 can be featureless so that the valve head 510 can be removably received within the cavity 628.

Cavity 629 in this case is formed by wall 622 and wall 627, and is cylindrically shaped. The cavity 629 can be configured (e.g., has a shape and size) to receive the first resilient device 460. In some cases, one or more of the walls that form cavity 629 can have one or more coupling features disposed thereon for coupling to the first resilient device 460, the second resilient device 461, and/or the retractable extension 462.

The outer surfaces of the piston follower 620 can have one or more of a number of features disposed thereon. For example, as shown in FIGS. 6A and 6D, there can be a number (in this case, two) of recesses 626 disposed therein. Such recesses 626 can be used to receive a sealing member (e.g., an o-ring, a gasket, wiper seal) to provide a seal between the piston follower 620 and the valve seat 840 within cavity 845 of the valve seat 840.

The travel piston 730 of the testable back pressure valve 400 can have any of a number of features and/or configurations. For example, as shown in FIGS. 7A-7D, the travel piston 730 can have a body 731 that forms one or more (in this case, one) cavities. In this case, the body 731 of the travel piston 730 forms cavity 739. Cavity 739 is disposed at the top end of the travel piston 730, and is formed by inner wall 733 and inner wall 732. The cavity 732 can be configured (e.g., has a shape and size) to receive the second resilient device 461 and/or the retractable extension 462. In some cases, one or more of the walls that form cavity 732 can have one or more coupling features disposed thereon for coupling to the second resilient device 461 and/or the retractable extension 462.

The outer surfaces of the travel piston 730 can have one or more of a number of features disposed thereon. For example, as shown in FIGS. 7A and 7C, there can be a number (in this case, two) of recesses 736 disposed therein. Such recesses 736 can be used to receive a sealing member (e.g., an o-ring, a gasket, wiper seal) to provide a seal between the travel piston 730 and the valve seat 840 within cavity 845 of the valve seat 840.

The housing 470 of the testable back pressure valve 400 has a body 473 inside of which are disposed a number of features. For example, there can be one or more ports 477 disposed within the body 473. Each port 477 can be connected to a port 854 of the valve seat 840. A port 477 can be used to allow fluids to flow into and/or out of the valve seat 840.

There can be one or more cavities formed within the body 473 of the housing 470. For example, in this case, there are two cavities that have continuity between them in the absence of the other components (e.g., the valve seat 840). Cavity 499 is disposed toward the top end of the housing 470, having an opening that is exposed at the top end of the housing 470. Cavity 499 is formed by inner wall 478 to form a cylindrical shape. Cavity 499 has disposed therein the upper portion of the valve seat 840. Below cavity 499 is cavity 474, which is formed by inner wall 476 into a cylindrical shape, where the diameter formed by the inner wall 476 is larger than the diameter formed by the inner wall 478. Cavity 474 is shaped and sized to form a gap 475 between inner wall 476 and the valve seat 840.

The inner walls of the body 473 of the housing 470 can have one or more of a number of features disposed thereon. For example, as shown in FIG. 4, there can be one or more recesses 472 disposed in inner wall 478. Such recesses 472 can be used to receive a sealing member (e.g., an o-ring, a gasket) to provide a seal between the valve seat 840 and the housing 470 of the testable back pressure valve 400. As another example, there can be one or more of a number of coupling features 471 (in this case, mating threads) disposed on the inner wall 478 of the housing 470 to couple to complementary mating features 856 of the valve seat 840 to allow the valve seat 840 to be coupled to the housing 470 of the testable back pressure valve 400.

In some cases, one or more other coupling features 489 can be disposed toward the top and/or bottom end of the housing 470. Such coupling features 489 (e.g., mating threads) can be disposed on an inner surface and/or an outer surface of the body 473 of the housing 470. Such coupling features 489 can be used to couple the testable back pressure valve 400 to another component (e.g., a tubing hanger, a casing hanger) of a field operation system (e.g., a BOP system 100, a production system 207).

Figure 10A:
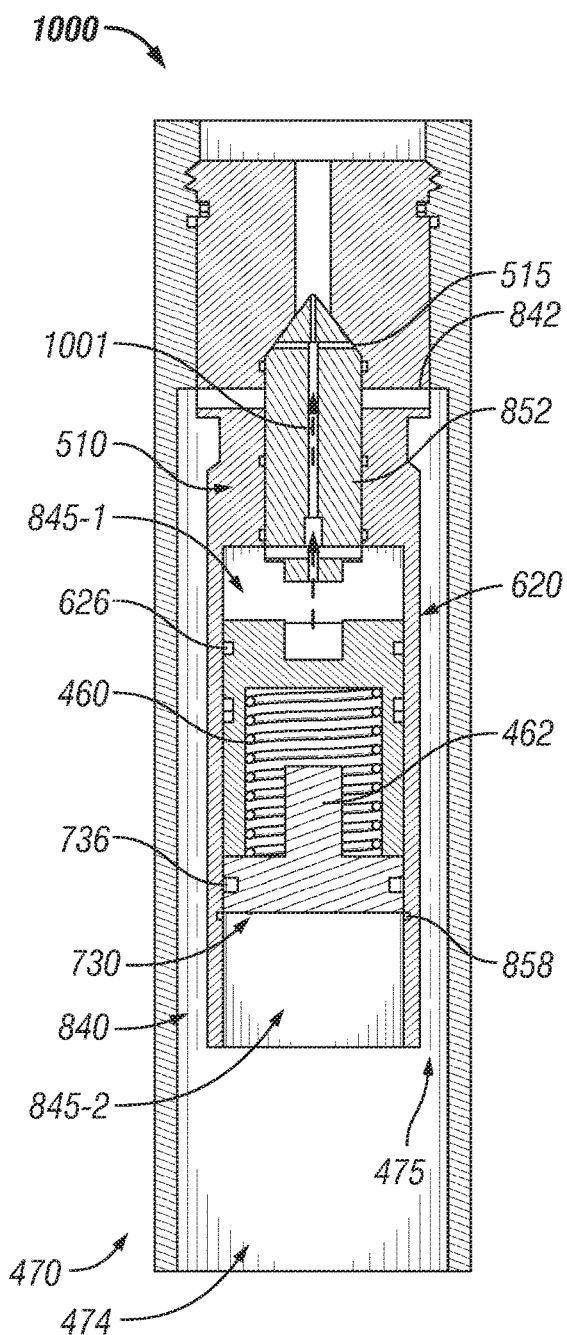
FIGS. 10A and 10B show the testable back pressure valve of FIG. 4 when checking the seal through a test port in accordance with certain example embodiments.
Figure 10B:
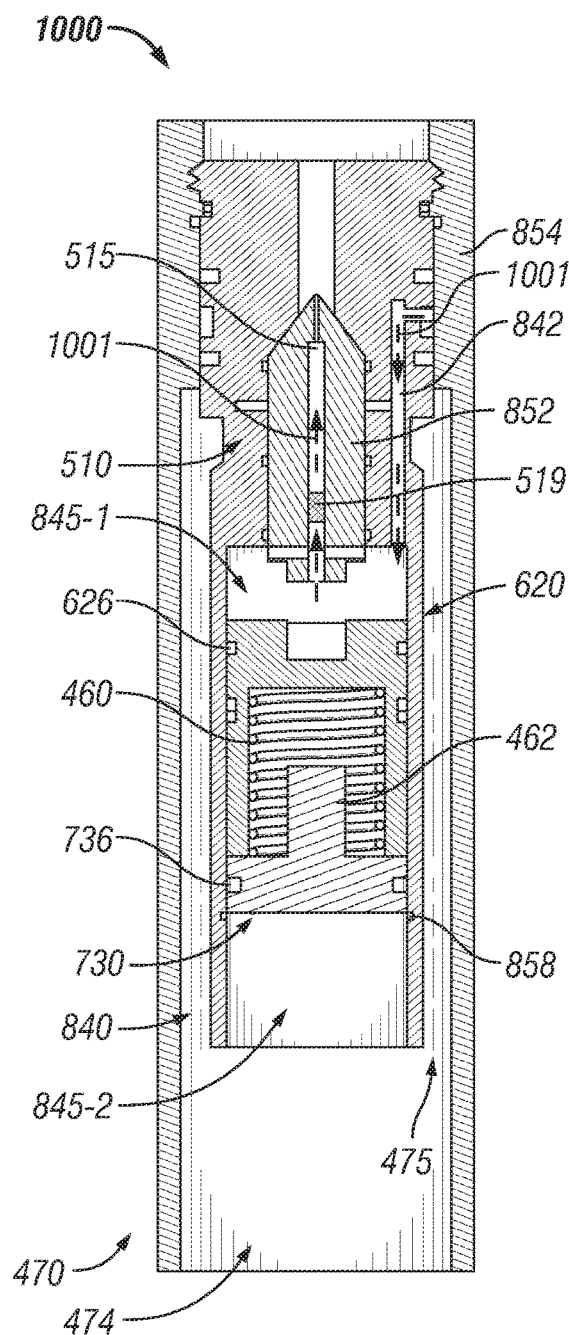
Figure 11A:
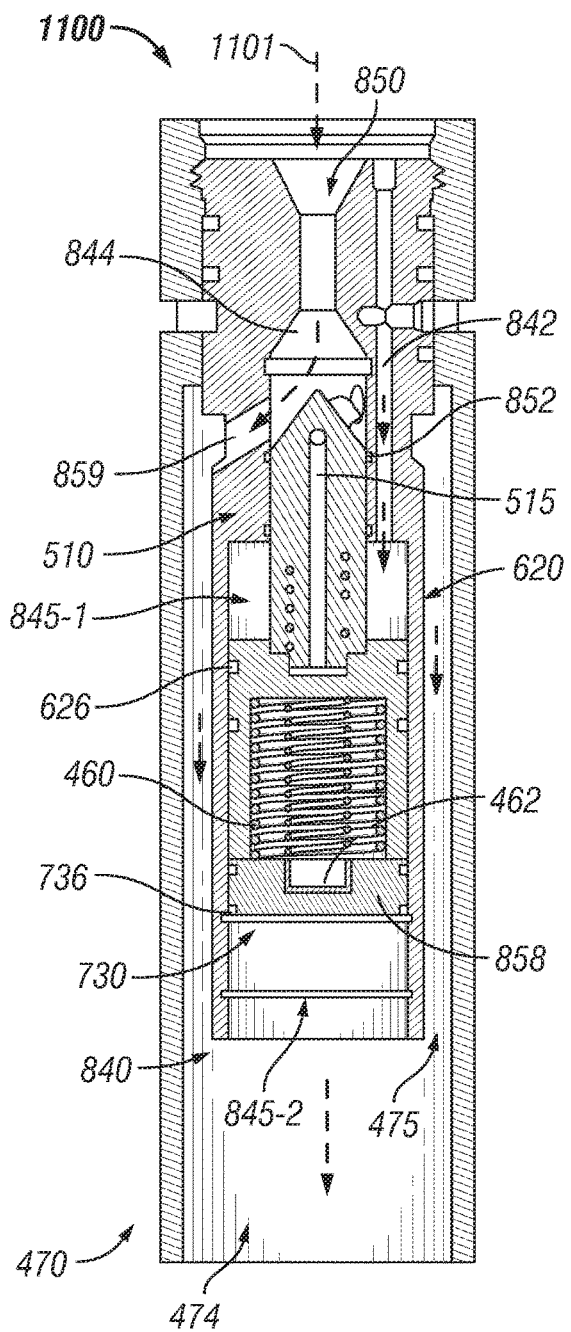
FIGS. 11A and 11B show the testable back pressure valve of FIG. 4 when testing the valve through the BOP in accordance with certain example embodiments.
Figure 11B:
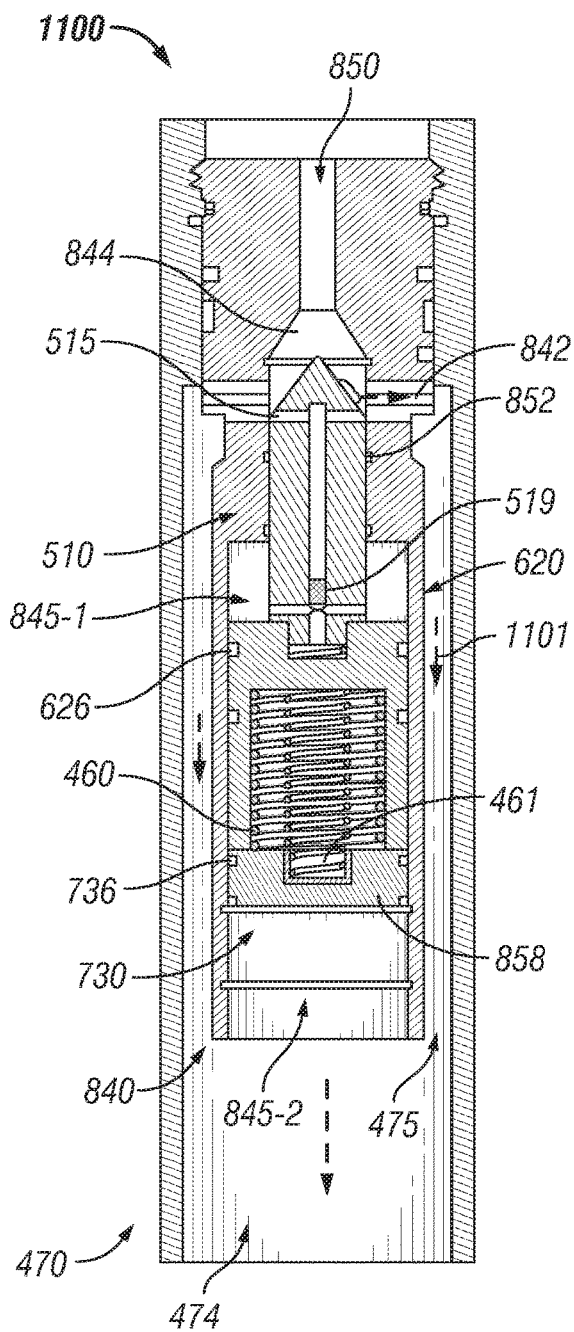

The optional retractable extension 462 can be disposed inside of the second resilient device 461, which itself can be disposed inside of the first resilient device 460. As explained below, this configuration of the multiple resilient devices can be used to allow the valve head 510, the travel piston 730, and the piston follower 620 to move independently of each other, thereby allowing the testable back pressure valve 400 to secure the well in the event of downhole pressure surges (as shown in FIG. 9 below), to allow for pumping fluid into the wellbore to control a downhole pressure surge (as shown in FIGS. 11A and 11B below), and to provide an external means to check the sealing function of the testable back pressure valve 400 (as shown in FIGS. 10A and 10B below).

Figure 9:
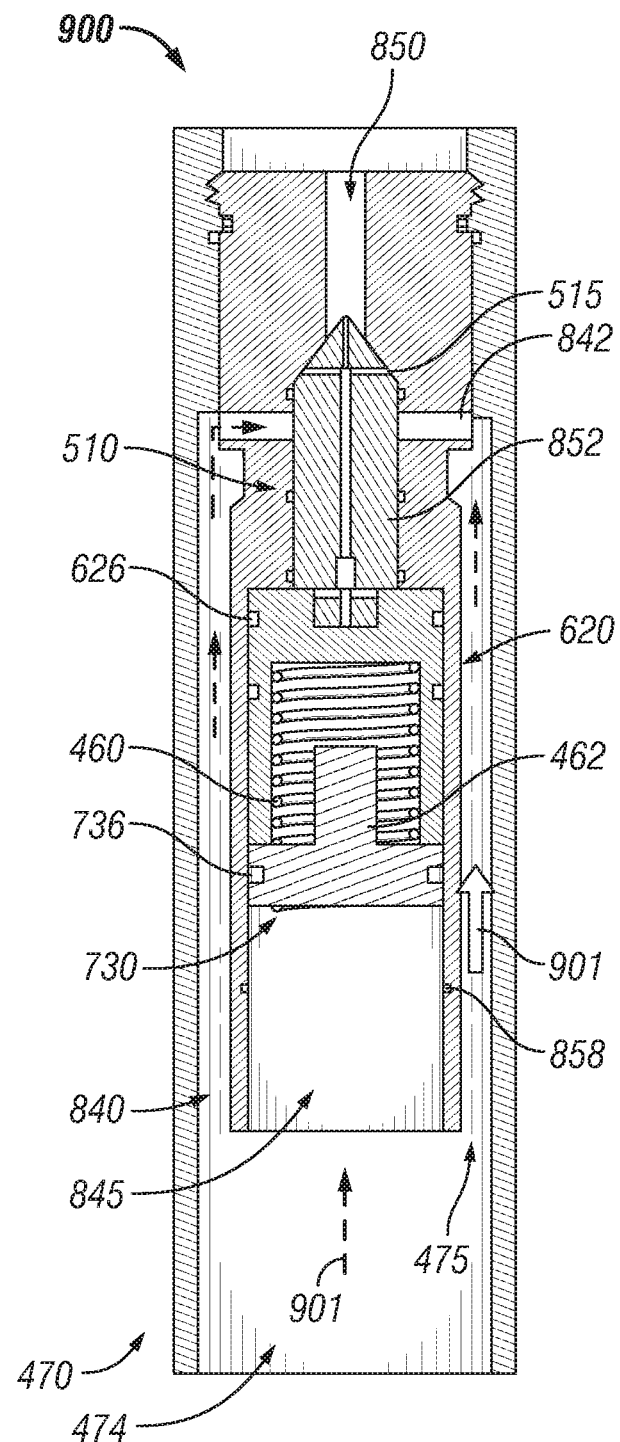
FIG. 9 shows the testable back pressure valve of FIG. 4 in a closed position in accordance with certain example embodiments.

FIG. 9 shows a cross-sectional side view of the testable back pressure valve 900 of FIG. 4 in a closed position due to a downhole pressure surge in accordance with certain example embodiments. FIGS. 10A and 10B show a cross-sectional side view and front view, respectively, of the testable back pressure valve 1000 of FIG. 4 in a position when checking the seal through a test port 854 in accordance with certain example embodiments. FIGS. 11A and 11B show a cross-sectional side view and front view, respectively, of the testable back pressure valve 1100 of FIG. 4 when testing the valve through the BOP in accordance with certain example embodiments.

Referring to FIGS. 1-11B, the testable back pressure valve 900 of FIG. 9 is in a fully closed position. The downhole fluid 901 is pressurized and flows upward toward the surface. When the fluid 901 encounters the testable back pressure valve 900, part of the fluid 901 enters the cavity 845 formed by the valve seat 840. When this occurs, the fluid 901 forces the travel piston 730 upward, compressing the first resilient device 460, the second resilient device 461, and the retractable extension 462, if any.

If the pressure of the fluid 901 is great enough, the fluid 901 can further force the piston follower 620 upward into the top of the cavity 845, which results from forcing the travel piston 730 further upward within the cavity 845 and further compressing the first resilient device 460, the second resilient device 461, and the retractable extension 462, if any. When the piston follower 620 is forced into the top of the cavity 845, the valve head 510 is forced into the top of cavity 844 of the valve seat 840.

The rest of the fluid 901 that does not flow into the cavity 845 of the valve seat 840 flows up into the gap 475 between the housing 470 and the valve seat 840. At the top of the gap 475, the fluid fills some of the channels 842 disposed in the valve seat 840. However, since the channels 515 of the valve head 510 are not aligned with the network of channels 842 of the valve seat 840, the valve head 510 closes off all of the channels 842 in the valve seat 840. Further, sealing devices disposed in the various recesses (e.g., recesses 852 in the valve seat 840, recesses 626 in the piston follower 620, recesses 736 in the travel piston 730) prevent any of the fluid 901 from seeping upward between components in the testable back pressure valve 900 into cavity 850. In addition, or in the alternative, a metal-to-metal seal is formed between adjacent components of the testable back pressure valve 900, creating a liquid-tight seal therebetween that prevents the fluid 901 from seeping through.

In FIGS. 10A and 10B, test fluid 1001 is injected through port 854 of the testable back pressure valve 1000. When this occurs, the fluid 1001 flows through the network of channels 842 in the valve seat 840, eventually ending up in the cavity 845 above the piston follower 620. When the force delivered by the fluid 1001 is great enough to overcome the pressure of downhole fluid, then the piston follower 620 (along with the first resilient device 460, the retractable extension 462, and the travel piston 730) is forced downward within the cavity 845. This divides the cavity 845 into an upper portion 845-1 and a lower portion 845-2.

When the piston follower 620 is forced downward within the cavity 845, expanding upper portion 845-1 and reducing lower portion 845-2, the valve head 510 remains disposed within cavity 844 of the valve seat 840 and is held in place by the fluid 1001 in the upper portion 845-1. Eventually, either because the downhole pressure again exceeds the pressure applied by the fluid 1001 entering the cavity 845 or because the travel piston 730 abuts against feature 858 of the valve seat 840, the size of the upper portion 845-1 stops expanding. In such a case, the fluid 1001 disposed in the upper portion 845-1 begins to flow into the channels 515 disposed in the valve head 510.

In this way, portion 845-1 becomes a pressurized cavity, and the valve head 510 is loaded against the valve seat 840. When this occurs, checks can be made for any leaks within the testable back pressure valve 1000. When the pressure of the fluid 1001 at the port 854 is reduced or eliminated, the downhole pressure moves the travel piston 730, the first resilient device 460, the retractable extension 462, and the piston follower 620 are pushed upward within the cavity 845, eliminating the upper portion 845-1.

In FIGS. 11A and 11B, fluid 1101 (e.g., kill fluid used in a kill operation) is injected at pressure downward into cavity 850 of the testable back pressure valve 1000. When the pressure behind the fluid 1101 is greater than the downhole pressure, the fluid 1101 pushes the valve head 510 downward within cavity 844 formed within the valve seat 840. As a result of the valve head 510 being pushed downward within cavity 844, the travel piston 730, the first resilient device 460, the second resilient device 461, the retractable extension 462, and the piston follower 620 are pushed downward within cavity 845.

Eventually, the travel piston 730 abuts against feature 858 of the valve seat 840, and the pressure from the fluid 1101 can translate to compression of the resilient device 460 and the second resilient device 461 within the cavity 845. As with the example of FIGS. 10A and 10B above, when this occurs, the cavity 845 is divided into an upper portion 845-1 and a lower portion 845-2.

When the valve head 510 is pushed far enough down in the cavity 844, the network of channels 842 and the exhaust port 859 become exposed (are no longer covered by the valve head 510). When this occurs, the fluid 1101 flows through the network of channels 842 and the exhaust port 859. The portion of the fluid 1101 that flows through the network of channels 842 ends up in the upper portion 845-1 of the cavity 845, eventually filling the upper portion 845-1 and preventing further flow of fluid 1101 through the network of channels 842. The remainder of the fluid 1101 flows through the exhaust port 859, leading into the gap 475 between the housing 470 and the valve seat 840 so that the fluid 1101 can flow downhole.

The channels 515 within the valve head 510 also become exposed to the fluid 1101. However, by inserting a check valve 519 within one or more of the channels 515, the fluid 1101 cannot reach upper portion 845-1 through the channels 515. This arrangement allows most of the fluid 1101 to flow through exhaust port 859 without causing undue damage from excessive pressure of the fluid 1101 through the channels 515 in the valve head 510 countering the flow of fluid 1101 in the network of channels 842 to the upper portion 845-1 of the cavity 845.

When the pressure behind the fluid 1101 is reduced or eliminated, then the first resilient device 460 and the second resilient device 461 return to their normal state, lifting the valve head 510 upward, at least partially, within cavity 844. Further, when the downhole pressure is strong enough, the travel piston 730, the first resilient device 460, the second resilient device 461, the retractable extension 462, and the piston follower 620 are pushed upward within the cavity 845, eliminating the upper portion 845-1 of cavity 845 and pushing the valve head 510 fully within cavity 844.

Figure 12:
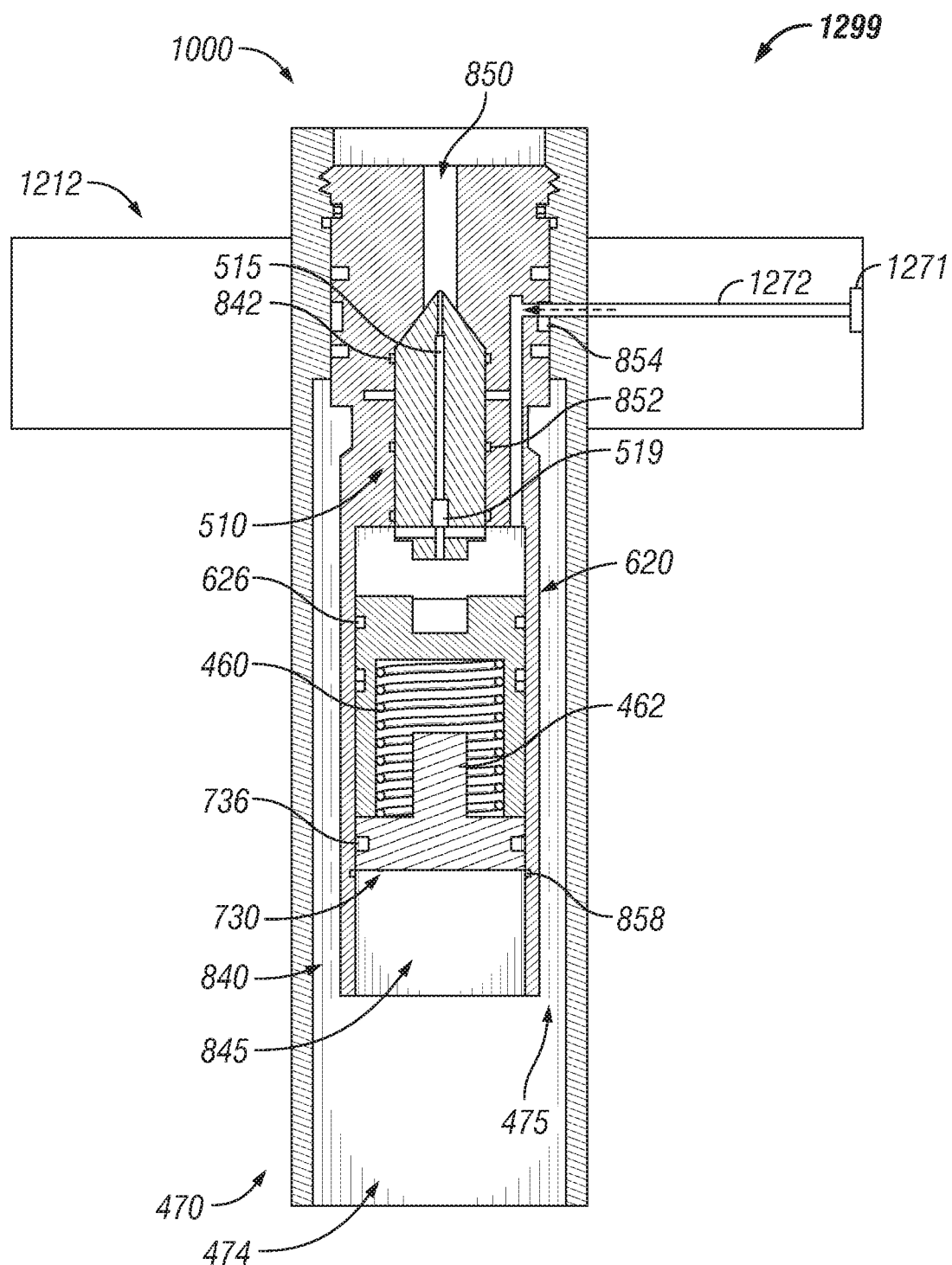
FIG. 12 shows a system that checks the seal of the valve in accordance with certain example embodiments.

FIG. 12 shows a cross-sectional side view of a system 1299 that checks the seal of the valve in accordance with certain example embodiments. Referring to FIGS. 1-12, the system 1299 includes the testable back pressure valve 1000 of FIGS. 10A and 10B. In addition, the system 1299 of FIG. 12 includes a casing head 1212 that is disposed around a portion of the testable back pressure valve 1000. The casing head 1212 includes a test port 1271 that is disposed on an outer surface of the casing head 1212. The casing head 1212 also has a channel 1272 that runs from the test port 1271 to a port 854 of the testable back pressure valve 1000. In this way, the system 1299 of FIG. 12 shows how seals of the testable back pressure valve 1000 can be checked using the port 854.

Figure 13:
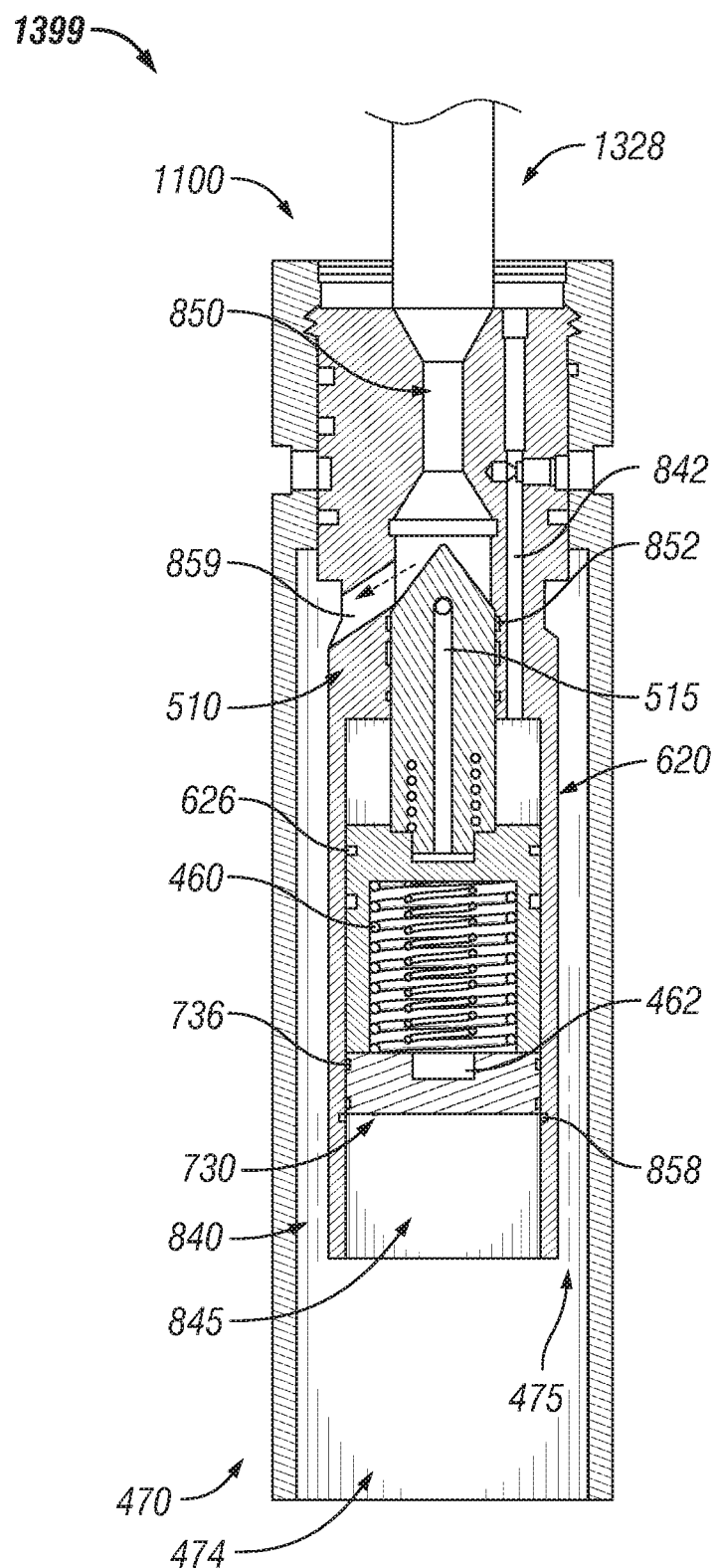
FIG. 13 shows a system that tests the valve through the BOP in accordance with certain example embodiments.

FIG. 13 shows a cross-sectional side view of a system 1399 that tests the valve through the BOP in accordance with certain example embodiments. Referring to FIGS. 1-13, the system 1399 includes the testable back pressure valve 1100 of FIGS. 11A and 11B. In addition, the system 1399 of FIG. 13 includes a testing rod 1328 that is coupled to the top end of the valve seat 840 of the testable back pressure valve 1100 at cavity 850. The testing rod 1328 can inject kill fluid or other fluid (e.g., fluid 1101) at pressure. In this way, the system 1399 of FIG. 13 shows how the testable back pressure valve 1000 can be tested through a BOP, a production system, or some other system as part of a field operation.

The systems, methods, and apparatuses described herein allow for testable back pressure valves. Example embodiments can control the flow of fluid for various modes of operation (testing) of a back pressure valve while the back pressure valve controls wellbore pressures. The pressure barriers of example embodiments are fully testable, above and below the back pressure valve unit, after installation. Once installed, example embodiments prevent the uncontrolled flow of downhole hydrocarbon fluids and gasses to the surface, but allow fluids to be pumped into the wellbore for well control/kill operations. As a result, example embodiments save time, ensure safe and more reliable operations, and use fewer resources compared to embodiments currently used in the art.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A testable back pressure valve, comprising:
a housing comprising a housing body;
a valve seat coupled to the housing, wherein the valve seat comprises a valve seat body having a first cavity and a second cavity, and wherein the valve seat further comprises a first network of channels disposed in the valve seat body;
a valve head movably disposed within the first cavity of the valve seat;
a piston follower movably disposed within the second cavity of the valve seat, wherein the valve head is fixedly coupled to the piston follower;
a travel piston movably disposed within the second cavity of the valve seat, wherein the travel piston is moveably coupled to the piston follower; and
a first resilient device disposed between and coupled to the piston follower and the travel piston within the second cavity of the valve seat.

2. The testable back pressure valve of claim 1, further comprising:
a retractable extension disposed within the first resilient device, wherein the retractable extension is disposed between and coupled to the piston follower and the travel piston within the second cavity of the valve seat.

3. The testable back pressure valve of claim 2, further comprising:
a second resilient device disposed around the retractable extension, wherein the second resilient device is disposed between and coupled to the piston follower and the travel piston within the second cavity of the valve seat.

4. The testable back pressure valve of claim 1, wherein the valve head comprises a second network of channels.

5. The testable back pressure valve of claim 4, wherein the second network of channels align with the first network of channels of the valve seat when the valve head is in a first position within the first cavity of the valve seat, and wherein the second network of channels fails to align with the first network of channels of the valve seat when the valve head is in a second position within the first cavity of the valve seat.

6. The testable back pressure valve of claim 5, wherein the first position corresponds to an operation of directing fluid flow into a wellbore, and wherein the second position corresponds to a default position.

7. The testable back pressure valve of claim 4, further comprising:
a check valve disposed within the second network of channels, wherein the check valve prevents fluid from flowing from a top end of the valve head to a bottom end of the valve head.

8. The testable back pressure valve of claim 1, wherein the valve seat further comprises a stop disposed within the second cavity, wherein the valve seat limits a range of motion of the travel piston.

9. The testable back pressure valve of claim 1, wherein the valve seat further comprises at least one port disposed on an outer surface of the body, wherein the at least one port is connected to the first network of channels.

10. A testable back pressure valve, comprising:
a housing comprising a housing body;
a valve seat coupled to the housing, wherein the valve seat comprises a valve seat body having a first cavity and a second cavity, and wherein the valve seat further comprises a first network of channels disposed in the valve seat body;
a valve head movably disposed within the first cavity of the valve seat;
a piston follower movably disposed within the second cavity of the valve seat, wherein the valve head is fixedly coupled to the piston follower; and
a travel piston movably disposed within the second cavity of the valve seat, wherein the travel piston is moveably coupled to the piston follower,
wherein the valve seat further comprises at least one port disposed on an outer surface of the body, wherein the at least one port is connected to the first network of channels.

11. The testable back pressure valve of claim 10, wherein the valve seat further comprises at least one coupling feature disposed on an outer surface of the body, wherein the at least coupling feature is coupled to at least one complementary coupling feature disposed on an inner surface of the body of the housing.

12. The testable back pressure valve of claim 10, wherein the housing further comprises at least one coupling feature disposed on the housing body, wherein the at least one coupling feature is configured to couple to another component of a field operation system.

13. The testable back pressure valve of claim 10, wherein the travel piston comprises at least one first recess into which at least one first sealing device is disposed, wherein the at least one first sealing device abuts against an inner wall of the valve seat that forms the second cavity.

14. The testable back pressure valve of claim 13, wherein the piston follower comprises at least one second recess into which at least one second sealing device is disposed, wherein the at least one second sealing device abuts against the inner wall of the valve seat that forms the second cavity.

15. The testable back pressure valve of claim 10, wherein the valve seat comprises at least one recess in the first cavity into which at least one wiping seal is disposed, wherein the at least one wiping seal abuts against an outer wall of the valve head.

16. The testable back pressure valve of claim 15, wherein the at least one wiping seal is configured to remove removes debris from the valve head as the valve head moves within the first cavity.

17. The testable back pressure valve of claim 10, wherein the piston follower moves within the second cavity between a first position and a second position, wherein the piston follower, when out of the first position, divides the second cavity into a first portion and a second portion, wherein a first fluid in the first portion is physically separated from a second fluid in the second portion by the piston follower within the second cavity.

18. A valve system comprising:
a casing head; and
a testable back pressure valve disposed within the casing head, wherein the testable back pressure valve comprises:
a housing comprising a housing body;
a valve seat coupled to the housing, wherein the valve seat comprises a valve seat body having a first cavity and a second cavity, and wherein the valve seat further comprises a first network of channels disposed in the valve seat body;
a valve head movably disposed within the first cavity of the valve seat;
a piston follower movably disposed within the second cavity of the valve seat, wherein the valve head is fixedly coupled to the piston follower; and
a travel piston movably disposed within the second cavity of the valve seat, wherein the travel piston is moveably coupled to the piston follower.

19. The valve system of claim 18, wherein the casing head comprises a first test port and a casing head channel connected to the first test port, wherein the housing further comprises a second test port connected to the casing head channel and the network of channels disposed in the valve seat.

20. The valve system of claim 18, further comprising:
a testing rod coupled to an upper end of the testable back pressure valve.

* * * * *